Aug. 31, 1937.　　　　E. E. LEICHTER　　　　2,091,324
TOAST EJECTOR FOR CONTINUOUS TOASTING MACHINES
Filed Aug. 26, 1936
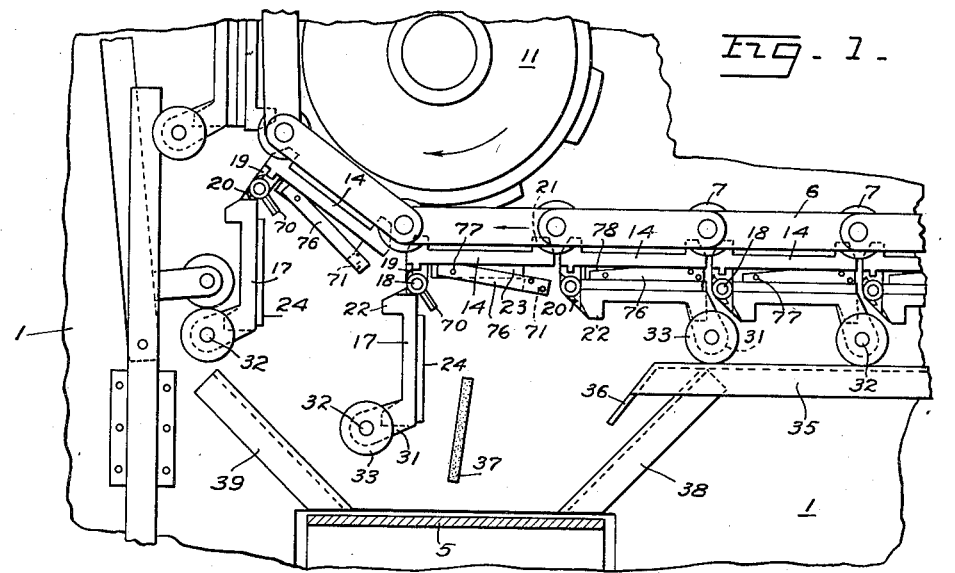
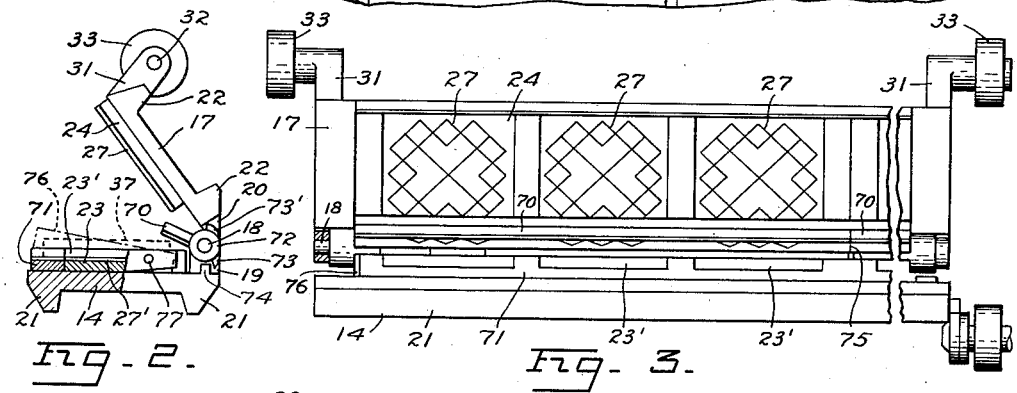
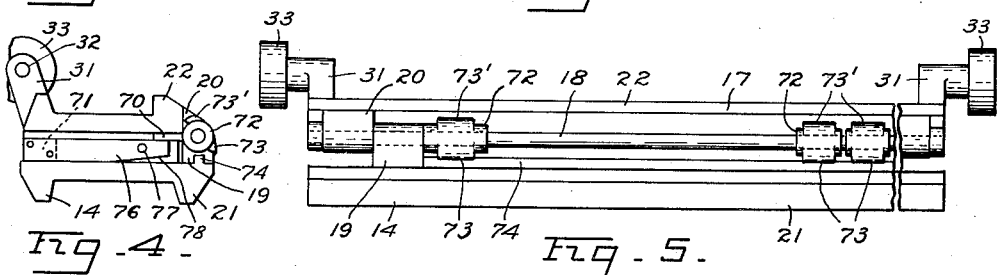
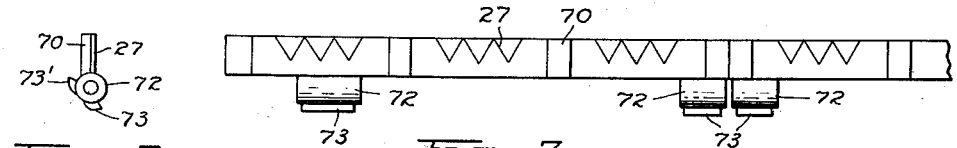
INVENTOR.
EDWARD E. LEICHTER
BY *Miller Bayken & Bried*
ATTORNEYS Patented Aug. 31, 1937

2,091,324

UNITED STATES PATENT OFFICE 2,091,324

TOAST EJECTOR FOR CONTINUOUS TOASTING MACHINES

Edward E. Leichter, San Francisco, Calif., assignor to Langendorf United Bakeries, Inc., San Francisco, Calif., a corporation of Delaware Application August 26, 1936, Serial No. 97,925

10 Claims. (Cl. 53—5)

This invention relates to continuous bread toasting machines of the endless conveyor type, as shown in my Patent No. 2,051,303, of August 18, 1936, and the principal object of the present invention is to provide automatically operated means which will eject the toasted bread slices from the toasting dies or plates.

Other objects of the invention are to provide a toast ejector for the type of machine mentioned which will be very simple in its parts, and reliable in its action. Other objects and advantages of the invention will appear in the following description and accompanying drawing.

In the drawing, Fig. 1 is a side elevation of a portion of an endless bread toasting machine, showing my ejector incorporated in the toasting plates in the act of ejecting a slice of toast.

Fig. 2 is an enlarged end view (partly in section) of a pair of the hinged toasting plates of the machine shown open ready to receive the bread slices.

Fig. 3 is a front view of the opened plates of Fig. 2 as seen from the left-hand side of Fig. 2.

Fig. 4 is an end view of the hinged toasting plates similar to Fig. 2 but showing the plates closed.

Fig. 5 is a rear view of the closed plates of Fig. 4 as seen from the right-hand side of Fig. 4.

Fig. 6 is an end view of the rear ejector section of the "upper" toasting plate—or that plate which is uppermost when the plates are open for reception of the bread slices for toasting.

Fig. 7 is a broken view of Fig. 6 as seen from the right-hand side thereof.

Before describing the improvement in detail it may be said that in my issued patent aforesaid, an endless conveyor consisting of a connected series of hinged toasting plates extending horizontally, belt-like, over supporting wheels, received the bread slices between the opened plates at one end of the upper run of the conveyor, the plates closed upon the bread, heat applied to the plates while traveling toasted the bread, and the plates opened near the final end of the lower run to drop out the toast preparatory to their passing over the end wheel to the upper run and receiving a fresh charge of bread slices for toasting. This is all clearly shown and described in my issued patent mentioned, and Fig. 1 of the present application is copied from a portion of Fig. 2 of said patent to show the opened toasting plates at the final end of the lower run of the conveyor where the toast falls out, for at this point it was found that owing to the toasting plates being formed with ribs and projections to give a waffle-like impression to the toast, that the slices adhered more or less to the configuration on the toasting surfaces of the plates so that sometimes they would not fall out when the plates were opened. The present improvement embraced in Fig. 1 shows gravity-operated devices forming part of the toasting plates, which force the toast free of the configuration of the plates so that they must fall from the toasting conveyor to any desired receiver or cross conveyor to carry the slices away.

To establish the identity of parts with those of my issued patent the figures designating parts in the present case where they also appear in the patent are the same for the same parts, thus the endless toasting conveyor is made up of a series of hinged toasting plates 14 and 17 hinged together along the "leading" edge at 18 and carried on heavy conveyor chains 6 provided with rollers 7 which pass over sprocket wheels 11 at opposite ends of the conveyor run and are rollably supported on tracks (not shown) intermediate the sprockets.

The toasting plates 14 and 17 are preferably heavy iron castings faced with aluminum plates 23, 24 which respectively contact opposite sides of the bread slices when the plates are closed and which aluminum plates are formed with raised configurations 27 on their confronting faces to give the toast slices a waffle-like impression of any desired design. The plates are long (transversely of the conveyor) so as to hold several slices of bread in a row, and they are exteriorly ribbed as at 21 and 22 to make them rigid.

At the upper or loading run of the conveyor plate 14 becomes the bottom or lower plate, and plate 17 the upper plate, and is provided with lugs 31 at its opposite ends fitted with rollers 33 revolvably supported on pins 32 for guiding in tracks, not shown, for opening the plates for receiving the bread slices and closing them during the remainder of the run through heating flames and to point of discharge of the toast on the lower run shown in Fig. 1 of the present drawing, reference being had to my issued patent mentioned for details of the apparatus not directly concerned with the present invention which has only to do with certain features of construction of the toasting plates to make them automatically toast-ejecting at the point shown in Fig. 1.

In Fig. 1, the plates being on the lower run of the conveyor, and supporting tracks 35 for plates 17 having terminated at 36, plate 17 swings by gravity downward to vertical position shown to permit the toast 37 to fall out to a cross belt conveyor 5 or suitable receptacle, guide plates 38, 39 extending from the walls 1 of the conveyor casing insuring that the toast fall within a limited area.

However, as the toast being made between hot plates with raised configured surfaces was found to stick occasionally in one or the other toasting plates, I provide the toast-contacting aluminum plates respectively with loose sections 70, 71, which take the form of long narrow sections of the toasting plates extending the full length thereof and arranged to swing outward from the plane of the plates when the plates are in discharge position of Fig. 1 and thereby force the toast slices out of the design configuration and insure their dropping from the plates every time at that point.

In Figs. 2 and 3 the toasting plates are shown open, as they would be on the upper run of the conveyor to receive the slices of bread to be toasted, and in which views the lower aluminum toasting plate 23 has a row of recesses 23' into which the slices 37 are placed and which are originally of a thickness to project somewhat above the lower plate so that the upper aluminum plate 24 will, when closed down, compress the slices slightly and force the raised design elements 27—27' into their opposite sides.

Loose section 70 of the upper plate 24 forms a continuation of the upper toasting surface and extends along adjacent the hinge pin 18 which passes through the hinge lugs 19 and 20 of the main plates 14 and 17 and is provided with lugs 72 loosely embracing the pin 18 and each lug is formed with projecting jaws 73, 73' so arranged respectively that as plate 17 is swung outwardly or "opened" with respect to plate 14 lugs 73' are contacted by the rear edge of plate 17 to lift section 70 to the position shown in Figs. 2, 3, and 1, to thereby eject the toast from plate 24. A rib 74 on the rear edge of plate 14 will contact lugs 73 to force plate section 70 out of alignment with plate 24 to make it swing out and lift the rear margins of the toast slices out of contact with plate 24. On account of the length of plates 24 and section 70 they may be divided transversely in the center as at 75 if desired.

The loose section 71 of the lower toasting plate 23 forms a continuation of its toasting surface and is positioned along the forward margin or free edge of the plate and is of a width to extend a short distance under all of the bread slices when they are in recesses 23' and at its extreme ends are secured two flat arms 76 which are pivoted at 77 to the ends of plate 23 so that section 71 will be free to swing outwardly when plates 23 and 14 are upside down as in Fig. 1. Arms 76 extend rearwardly beyond pivotal points 77 and are beveled off at 78 to form stops against main plate 14 to limit the outward swinging of section 71 to about the amount shown in Fig. 1 to insure its pushing the slices of toast out of engagement with the design configurations of plate 23.

When the plates are in open position shown in Fig. 2, stop lugs 73 insure loose section 70 being elevated sufficiently to clear the bread slices being placed in the recesses 23', and when the plates are closed upon the slices, both loose sections are aligned with their respective plates to form continuous toasting surfaces against the slices.

In the operation of the apparatus it will be noted that when the toasting plates successively fall open, as in the position shown in Fig. 1, the ejecting marginal sections of the plates are projected outwardly at opposite margins respectively of the plates so that it would be impossible for a slice of toast to adhere to or remain on either the upper or lower plate, but must fall from the machine. Also, that as the opened plates advance in direction of the arrows around the wheel 11 the lower section 71 will fall back to alignment with the lower plate 23, and the upper section to the position shown in Fig. 2 as long as the upper plate is held open, and to alignment with plate 24, as indicated in Fig. 4, when the plates are closed upon the bread slices.

Having thus described my invention in connection with the continuous type of bread toasting machine for which it was devised, what I claim is:

1. In a bread slice toasting machine a pair of toasting plates formed with a surface design in relief and arranged in confronting relation for clamping against opposite sides of the bread slices to be toasted, means mounting said plates for relative movement for opening and closing the plates, one of said plates provided with a loose section forming a flush continuation of its toasting surface and including said design, and means mounting said loose section whereby it will project outward from its plate when the plates are opened.

2. In a bread slice toasting machine a pair of elongated toasting plates formed with a surface design in relief and arranged in confronting relation for clamping against opposite sides of a row of the bread slices to be toasted, means mounting said plates for relative movement for opening and closing the plates, one of said plates provided with a loose section forming a continuation of its toasting surface extending across the margins of the slices in said row, and means mounting said loose section whereby it will project outward from its plate when the plates are opened.

3. In a bread slice toasting machine a pair of toasting plates formed with a surface design in relief and arranged in confronting relation for clamping against opposite sides of the bread slices to be toasted, means mounting said plates for relative movement for opening and closing the plates, said plates each provided with a loose section respectively on opposite margins of the plates forming a continuation of its toasting surface, and means mounting said loose sections whereby they will swing outward from their plates when the plates are opened.

4. In a bread slice toasting machine, a pair of toasting plates hingedly connected together along one edge for opening and closing to clamp between them the slices of bread to be toasted, means mounting the plates for travel through a heat zone and swinging open at the point of discharge of the toasted slices, and means forming a flush continuing part of the toasting surfaces of the plates when the plates are closed arranged to project outwardly from the plates as they swing open to thereby eject the toasted slices.

5. In a bread slice toasting machine, a pair of toasting plates hingedly connected together along one edge for opening and closing to clamp between them the slices of bread for toasting, a conveyor upon which the plates are mounted arranged to permit gravity opening of the plates at a predetermined point, and a loose section along the margin of each plate pivotally mounted in relation thereto arranged and adapted to swing outwardly from its plate to eject the toast slices as the plates are opened.

6. In a bread slice toasting machine, a pair of toasting plates hingedly connected together along one edge for opening and closing to clamp between them the slices of bread for toasting, a conveyor upon which the plates are mounted arranged to permit gravity opening of the plates at a predetermined point, and a loose section along the margin of each plate pivotally mounted in relation thereto arranged and adapted to swing outwardly from its plate to eject the toast slices as the plates are opened, one of said loose sections being pivoted on a common axis with the hinging of the plates and provided with means limiting its swing in relation to the opening of the plates.

7. In a bread slice toasting machine, a pair of toasting plates hingedly connected together along one edge for opening and closing to clamp between them the slices of bread for toasting, a conveyor upon which the plates are mounted arranged to permit gravity opening of the plates at a predetermined point, and a loose section along the margin of each plate pivotally mounted in relation thereto arranged and adapted to swing outwardly from its plate to eject the toast slices as the plates are opened, one of said loose sections extending along the free margin of the toasting plate to form a continuation thereof and pivoted at its outer ends to the toasting plate.

8. In a bread slice toasting machine, a pair of toasting plates hingedly connected together along one edge for opening and closing to clamp between them the slices of bread for toasting, a conveyor upon which the plates are mounted arranged to permit gravity opening of the plates at a predetermined point, and a loose section along the margin of each plate pivotally mounted in relation thereto arranged and adapted to swing outwardly from its plate to eject the toast slices as the plates are opened, one of said loose sections extending along the free margin of the toasting plate to form a continuation thereof and provided with laterally extending arms pivoted at their outer ends to the toasting plate.

9. In a structure as specified in claim 2, one of the toasting plates formed with a row of recesses to receive the bread slices and said recesses extending entirely through its loose section.

10. A pair of confronting elongated toasting plates hingedly connected together along one edge and provided with a row of recesses in one of the plates to receive each a slice of bread for toasting, a marginal rim bordering each recess forming a stop to limit the approach of the other plate when the plates are closed, and said rim being omitted at the forward or free edge of the plate to provide an opening through the free margin of the plate for facilitating the introduction of bread slices to the recesses.

EDWARD E. LEICHTER.